United States Patent
Lo

(10) Patent No.: US 7,453,879 B1
(45) Date of Patent: Nov. 18, 2008

(54) METHOD AND APPARATUS FOR DETERMINING THE LANDING ZONE OF A TCP PACKET

(75) Inventor: John M. Lo, Fremont, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 654 days.

(21) Appl. No.: 11/098,207

(22) Filed: Apr. 4, 2005

(51) Int. Cl.
*H04L 12/56* (2006.01)
(52) U.S. Cl. ..................................... 370/394
(58) Field of Classification Search ................. 370/394, 370/392, 474, 470, 472, 471; 709/223, 224, 709/225, 232, 235, 236; 714/1, 2, 50, 51, 714/819
See application file for complete search history.

(56) References Cited

U.S. PATENT DOCUMENTS

| | | | |
|---|---|---|---|
| 5,151,899 A * | 9/1992 | Thomas et al. ............... | 370/394 |
| 6,011,796 A * | 1/2000 | Rezaiifar et al. ............ | 370/394 |
| 6,314,101 B1 * | 11/2001 | Rezaiifar et al. ............ | 370/394 |
| 2004/0133713 A1 * | 7/2004 | Elzur ........................... | 710/52 |
| 2005/0286526 A1 * | 12/2005 | Sood et al. ................... | 370/394 |

* cited by examiner

*Primary Examiner*—Kwang B. Yao
*Assistant Examiner*—Anh Ngoc Nguyen
(74) *Attorney, Agent, or Firm*—Park, Vaughan & Fleming LLP

(57) ABSTRACT

A method and apparatus for determining whether a TCP packet lands in-zone or out-of-zone of a TCP sequence space. An anchor representing the TCP sequence number of the last TCP data byte, plus one, is updated each time a TCP data packet is received. When a new TCP packet is received, the most significant bit, bit [31], is extracted from the anchor. A two-bit value is formed by adding 1 to the extracted bit. This two-bit value is pre-pended to bits [30:0] of the anchor, as bits [32:31], to produce a 33-bit test value. Then, the sequence number of the last TCP byte of the received packet is then compared to the anchor and the test value. If the sequence number is greater than or equal to the anchor, and less than the test value, the packet lands in-zone and may be processed normally.

13 Claims, 2 Drawing Sheets

METHOD AND APPARATUS FOR DETERMINING THE LANDING ZONE OF A TCP PACKET

BACKGROUND

This invention relates to the field of computer systems. More particularly, a method and apparatus are provided for determining which portion of a TCP (Transport Control Protocol) sequence space the contents of a TCP packet land in.

Information (e.g., data, packets, cells) sent or received over an electronic communication connection is often numbered and tracked. Incoming data may then be compared to what was expected, to ensure sequential processing of the data, to verify that all information is received, to identify duplicate or corrupted data, or for some other purpose.

For example, data transmitted via a TCP connection is sequentially numbered (by byte); each TCP packet identifies the sequence numbers of the data bytes it conveys. Illustratively, a packet header may identify the sequence number of the first or last byte of TCP data in the packet, along with the total amount of data.

Based on the sequence numbers of data previously received over a given TCP connection, the recipient may determine (by sequence number) what data should be received next. If the sequence numbers of the contents of the next packet fall within the range of expected sequence numbers (e.g., the sequence numbers immediately following those of the previous packet), the packet may be considered to fall "in-zone." If the sequence numbers fall outside the expected range, the packet may be considered to fall "out-of-zone." An out-of-zone packet or sequence number may indicate a packet that is out-of-order, corrupted, a duplicate, etc. Out-of-zone packets need to be identified because they may require special processing by the recipient.

A TCP sequence numbering scheme is circular in nature, in that it starts at zero and wraps around from a maximum value back to zero. The TCP sequence space may be divided in half, with one half representing in-zone sequence numbers and the other half out-of-zone sequence numbers. Because the range of expected or in-zone sequence numbers changes with each TCP data packet received, the zones change for each data packet.

The TCP sequence space may be divided by selecting some sequence number as an anchor or starting point, and adding half the maximum sequence number. The sum represents a relative midpoint in the sequence space, between the selected anchor and the point at which the sequence numbers would wrap around to the anchor. The in-zone range comprises sequence numbers greater than the anchor and less than the midpoint, while the out-of-zone range of sequence numbers comprises sequence numbers greater than the midpoint and less than the anchor.

Traditionally, an adder was employed to generate the relative midpoint. However, due to the size of TCP sequence numbers (32 bits) such an adder is large (i.e., 33 bits) and requires substantial logic. And, with the ever-increasing data rates, computation of the midpoint for each packet becomes a bottleneck in the processing of incoming TCP packets, thereby limiting the effective throughput.

SUMMARY

In one embodiment of the invention, a method and apparatus are provided for determining whether a TCP packet lands in-zone or out-of-zone of a TCP sequence space. An anchor representing the TCP sequence number of the last TCP data byte, plus one, is updated each time a TCP data packet is received. Thus, the anchor identifies the TCP sequence number of the next TCP data byte that should be received.

When a new TCP packet is received, the most significant bit, bit [31], is extracted from the anchor. A two-bit value is formed by adding 1 to the extracted bit. This two-bit value is pre-pended to bits [30:0] of the anchor, as bits [32:31], to produce a 33-bit test value.

Then, the sequence number of the last TCP byte of the received packet is then compared to the anchor and the test value. If the sequence number is greater than or equal to the anchor, and less than the test value, the packet lands in-zone and may be processed normally. Otherwise, the packet is out-of-zone and may receive special processing or may be discarded.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In an embodiment of the invention, a method and apparatus are provided for determining which portion of a TCP (Transport Control Protocol) sequence space a TCP packet lands in. If the sequence numbers of the packet's data fall within an expected range, it is considered in-zone or on the right-hand side of the sequence space. If the data's sequence numbers fall outside the expected range the packet is considered to fall out-of-zone or on the left-hand size of the sequence space.

The sequence space is wrap-around in nature, in that sequence numbers run from zero through a maximum number (e.g., $2^{32}-1$) and back to zero. The wrap-around TCP sequence space is divided into in-zone and out-of-zone regions by placing an anchor at the sequence number of the last TCP data byte received plus one (i.e., the next TCP data byte to be received). The anchor is automatically adjusted as packets are received.

A relative midpoint, which may be termed a "test value" herein, is determined such that half the TCP sequence numbers—the in-zone half—are greater than or equal to the anchor and less than the midpoint, and the other half—the out-of-zone half—are greater than or equal to the midpoint and less than the anchor.

Instead of adding half the size of the sequence space to the anchor, in one embodiment of the invention a much faster method of determining the midpoint or test value is employed. In this embodiment, the most significant bit of the anchor (e.g., bit 31 of a 32-bit sequence number having the form [31:0]) is extracted and the value 1 is added to that bit. The sum is pre-pended (e.g., as a two-bit value) to the rest (e.g., bits [30:0]) of the anchor (e.g., as bits [32:31]). The result is the midpoint or test value.

Figure 1:
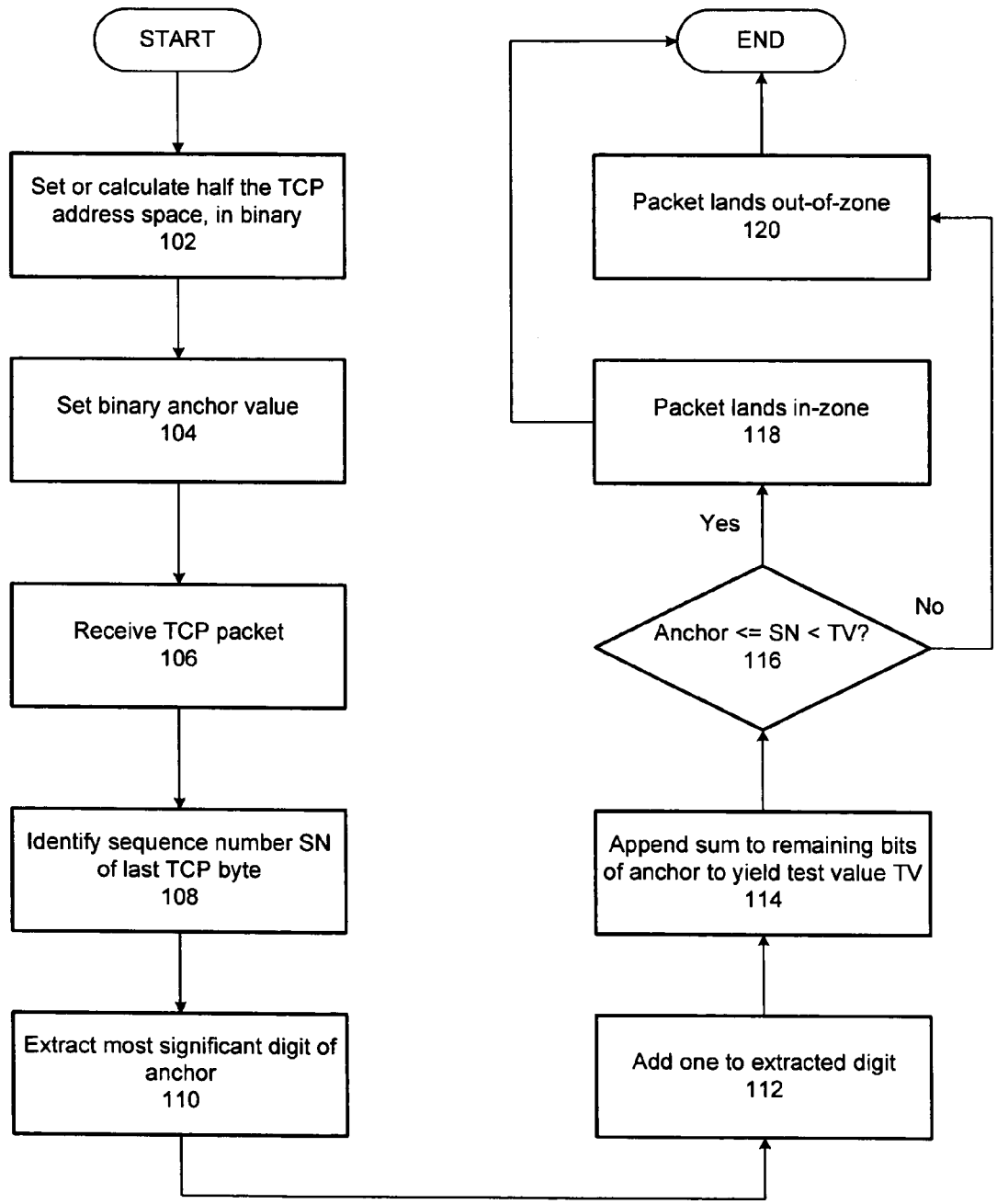
FIG. 1 is a flowchart illustrating one method of determining whether a received TCP packet lands on the left-hand or right-hand side of a TCP sequence space, in accordance with an embodiment of the invention.

FIG. 1 demonstrates a method of determining the landing zone of a received TCP packet, according to one embodiment of the invention. The illustrated method indicates whether the packet lands in-zone (e.g., in the right-hand side of the TCP sequence space) or out-of-zone (e.g., in the left-hand side of the sequence space).

One implementation of this embodiment may be coded in a hardware description language such as VHDL (Very high speed integrated circuit Hardware Description Language) or Verilog. A method described herein may thus be coded in hardware or firmware logic included in a communication interface configured to host TCP connections, such as a network interface card.

In operation 102, a value representing half the TCP sequence space is set, which may be termed half_TCP. For example, if sequence numbers are 32 bits in size, the address space contains $2^{32}$ sequence numbers, the minimum sequence number is 0 and the maximum sequence number is $2^{32}-1$. The sequence space wraps around from $2^{32}-1$ to 0.

Each zone or half of the sequence space therefore contains $2^{31}$ sequence numbers. The value $2^{31}$ is therefore coded (e.g., as a constant), or logic may be constructed for dynamically computing the value (e.g., during initialization of the communication interface or setup of a TCP connection).

In operation 104, an anchor is set to mark the expected sequence number of the first byte of TCP data of the next packet or some other specific sequence number. In this embodiment of the invention, the status (e.g., sequence numbers) of each TCP connection received at the communication interface is maintained separately.

In operation 106, a TCP packet is received via the TCP connection.

In operation 108, the sequence number (SN) of the last byte of TCP data of the packet is identified. In other implementations, the sequence number of the first byte or some other byte of the packet's data may be identified.

In operation 110, the most significant bit of the anchor is examined or extracted. If the sequence numbers are 32 bits wide, represented as [31:0], then bit [31] is the bit that is examined.

In operation 112, the value 1 is added to the examined bit. The sum may be represented as a two-bit value, which will be either 2'b01 or 2'b10 (wherein "b" indicates a binary value). The value 1 represents the most significant bit (bit [31]) of half TCP. The sum is one of the two bit binary values 01 and 10, which may be represented as 2'b01 and 2'b10.

Instead of an addition, the value of the examined bit may simply be used to decide which of the two two-bit values to produce. If the examined bit is 1, the value 2'b10 is output; if the bit is 0, the value 2'b01 is output.

In operation 114, the sum is pre-pended to the remaining bits (e.g., bits [30:0] of the anchor, as bits [32:31], to produce a 33-bit value representing the midpoint of the TCP sequence space starting from the anchor. The result is called a "test value" herein, because it will be used to help test whether the packet landed in-zone or out-of-zone.

In operation 116, the sequence number of the last TCP byte of the packet is compared to the anchor and the test value. If the sequence number is greater than (or equal to) the anchor and less than the test value, it is in-zone and the method continues with operation 118. Otherwise, the sequence number or packet is considered out-of-zone and the illustrated method advances to operation 120.

In operation 118, the packet is in-zone and can be processed normally. The method then ends or returns to operation 104.

In operation 120, the packet is out-of-zone and so additional processing may be performed to handle the packet or the packet may be discarded. The method then ends or may return to operation 106 (or possibly operation 104).

In other embodiments of the invention, the operations of the method of FIG. 1 may be performed in different orders. For example, the test value may be computed before or after a packet to be tested is received Also, based on the disclosed embodiments of the invention, other embodiments may be developed for communication protocols other than TCP without exceeding the scope of the invention. In particular, embodiments may be readily implemented to compute relative midpoints of any sequence space based on sequence numbers $2^n$ in size, where n>1.

Figure 2:
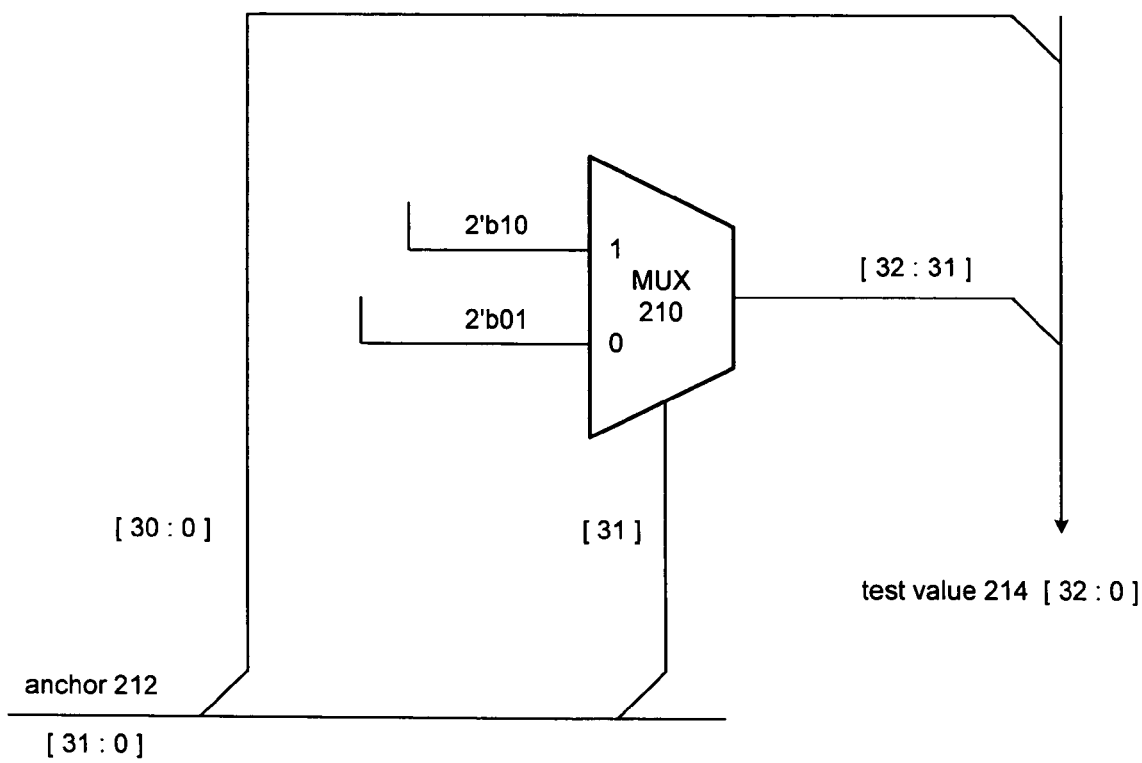
FIG. 2 depicts logic for determining whether a received TCP packet lands on the left-hand or right-hand side of a TCP sequence space, in accordance with an embodiment of the present invention.

FIG. 2 demonstrates logic that may be employed to perform a method of the invention described herein. The logic may be implemented within a network interface card, modem, router, switch, gateway or other communication apparatus. This embodiment is configured for a 32-bit TCP sequence space but may be modified as necessary for other communication protocols or environments.

Apparatus 202 receives a 32-bit anchor value via anchor line 212. Bits [30:0] are extracted from the anchor to form bits [30:0] of test value 214, a 33-bit value.

Bit [31] of anchor 212 is extracted and used to control mux 210, which outputs two bits to form bits [32:31] of test value 214. The mux outputs 2'b10 if bit [31] of the anchor is 1 and outputs 2'b01 if bit [31] of the anchor is 0.

In one alternative embodiment of the invention, a 2-bit adder may be employed in place of mux 210.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. An automated method of determining whether a TCP (Transmission Control Protocol) packet lands in-zone within a wrap-around TCP sequence space, the method comprising:

setting an anchor configured to identify a TCP sequence number N bits in length and representable as [N−1:0], wherein N is an integer greater than zero;

calculating a test value N+1 bits in length and representable as [N:0] by:
  selecting bit [N−1] of said anchor;
  adding 1 to said selected bit to generate bits [N:N−1] of said test value;
  copying bits [N−2:0] of said anchor to said test value; and
comparing a TCP sequence number of the TCP packet to said test value.

2. The method of claim 1, wherein the TCP packet is in-zone if the TCP sequence number is:
  greater than or equal to said anchor; and
  less than said test value.

3. The method of claim 1, wherein the TCP packet is out-of-zone if the TCP sequence number is:
  less than said anchor; and
  greater than said test value.

4. The method of claim 3, wherein the TCP is out-of-zone if the TCP sequence number is equal to said test value.

5. The method of claim 1, wherein N=32.

6. The method of claim 1, wherein the TCP sequence number is the TCP sequence number of the last TCP byte in the TCP packet.

7. A computer readable medium storing instructions that, when executed by a computer, cause the computer to perform a method of determining whether a TCP (Transmission Control Protocol) packet lands in-zone within a wrap-around TCP sequence space, the method comprising:
  setting an anchor configured to identify a TCP sequence number N bits in length and representable as [N−1:0], wherein N is an integer greater than zero;
  calculating a test value N+1 bits in length and representable as [N:0] by:
    selecting bit [N−1] of said anchor;
    adding 1 to said selected bit to generate bits [N:N−1] of said test value;
    copying bits [N−2:0] of said anchor to said test value; and
  comparing a TCP sequence number of the TCP packet to said test value.

8. An automated method of determining the landing zone of a received packet formatted according to a communication protocol in which packet data are sequentially numbered in a wrap-around sequence space, the method comprising:
  receiving a first packet over a communication connection;
  configuring an anchor to identify a sequence number of data expected to be received with a subsequent packet received over the connection;
  extracting a most significant bit of the anchor;
  adding 1 to the extracted bit to produce a sum;
  copying all bits of the anchor except the most significant bit into a test value;
  pre-pending said sum as the most significant bits of said test value; and
  receiving the subsequent packet;
  identifying a sequence number of data contained in the subsequent packet; and
  comparing the identified sequence number with the anchor and the test value.

9. The method of claim 8, wherein the subsequent packet lands in-zone if the identified sequence number is:
  greater than the anchor; and
  less than the test value.

10. The method of claim 9, wherein the subsequent packet lands in-zone if the identified sequence number is equal to the anchor.

11. The method of claim 8, wherein the subsequent packet lands out-of-zone if the identified sequence number is:
  less than the anchor; and
  greater than the test value.

12. The method of claim 11, wherein the subsequent packet lands out-of-zone if the identified sequence number is equal to the test value.

13. An apparatus for determining the landing zone of a TCP (Transmission Control Protocol) packet, comprising:
  an anchor line configured to carry a binary anchor value N bits in length, wherein N>0;
  a multiplexer configured to:
    input bit [N−1] of said anchor; and
    output bits [N:N−1] of a binary test value N+1 bits in length;
    wherein said bits [N:N−1] of said test value comprise the sum of said bit [N−1] of said anchor plus one;
  a test value line configured to carry said test value;
  wherein bits [N−2:0] of said test value are equal to bits [N−2:0] of said anchor.

* * * * *